United States Patent
Granick

(10) Patent No.: US 6,913,141 B2
(45) Date of Patent: Jul. 5, 2005

(54) ARTICULABLE MEDIA CASE

(76) Inventor: Daniel H. Granick, 6 Chestnut Ter., Buffalo Grove, IL (US) 60089

( * ) Notice: Subject to any disclaimer, the term of this patent is extended or adjusted under 35 U.S.C. 154(b) by 0 days.

(21) Appl. No.: 10/935,490

(22) Filed: Sep. 7, 2004

(65) Prior Publication Data

US 2005/0029134 A1 Feb. 10, 2005

Related U.S. Application Data

(63) Continuation of application No. 10/324,697, filed on Dec. 20, 2002, now abandoned.

(51) Int. Cl.[7] .............................................. B65D 85/57
(52) U.S. Cl. .................... 206/308.1; 206/312
(58) Field of Search .............................. 206/307, 308.1, 206/309–313; 220/4.21, 4.22, 4.24, 810, 817–820, 822, 826, 836, 837

(56) References Cited

U.S. PATENT DOCUMENTS

| | | | | |
|---|---|---|---|---|
| 5,407,073 A | * | 4/1995 | Uchida | 206/312 |
| 5,429,240 A | * | 7/1995 | Biebel et al. | 206/309 |
| 5,697,498 A | * | 12/1997 | Weisburn et al. | 206/308.1 |
| 5,746,314 A | * | 5/1998 | Knutsen et al. | 206/308.1 |
| 5,839,576 A | * | 11/1998 | Kim | 206/308.1 |
| 5,881,870 A | * | 3/1999 | Nakahira et al. | 206/308.1 |
| 6,170,658 B1 | * | 1/2001 | Dering | 206/308.1 |

OTHER PUBLICATIONS

Folding Puzzle Device, photographs attached which was publicly available at least as early as Dec. 19, 2001.

* cited by examiner

Primary Examiner—Luan K. Bui
(74) Attorney, Agent, or Firm—Greenberg Traurig

(57) ABSTRACT

A carrier/case for disc-like media is provided in the form of a puzzle device. Articulation of pivotable components reveals one or more storage areas into which the media may be placed and subsequently concealed.

7 Claims, 5 Drawing Sheets

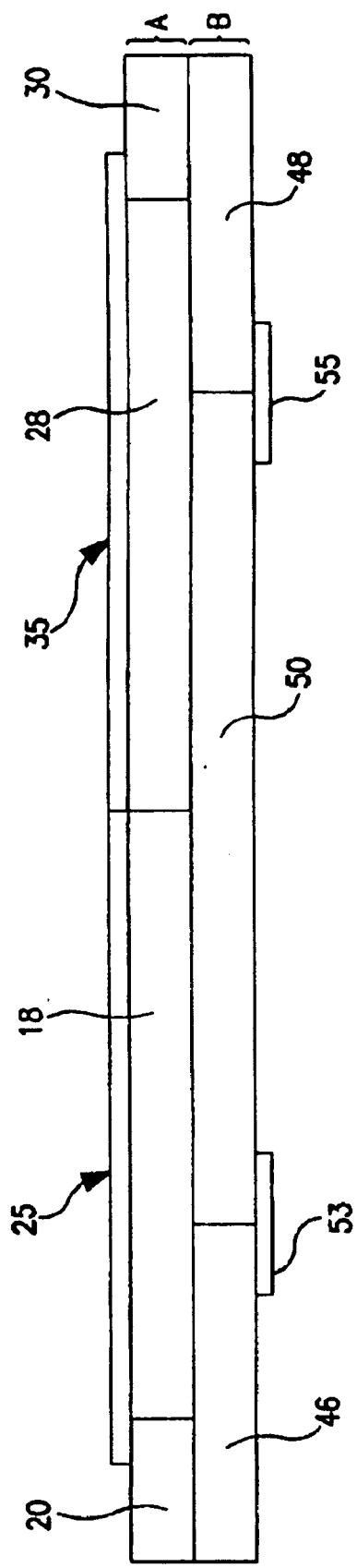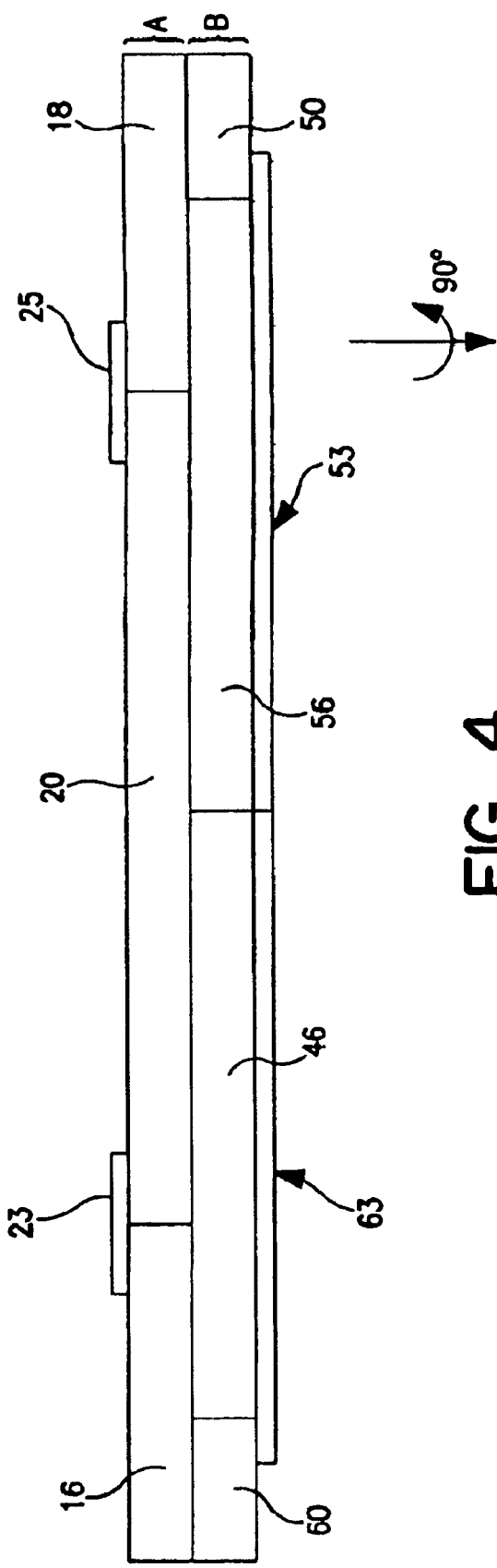

ARTICULABLE MEDIA CASE

This application is a continuation of U.S. Ser. No. 10/324,697, filed Dec. 20, 2002, and now abandoned.

BACKGROUND OF THE INVENTION

1. The Technical Field

The present invention relates to cases for the containment and protection of objects like compact discs, CD-ROMs and Digital Video Discs. The present invention also relates to jointed puzzles and games that involve the movement of interconnected components, to change the configuration of an object to another, distinctly different configuration.

2. The Prior Art

Cases for media, such as compact discs (CDs), CD-rooms, and Digital Video Discs (DVDs) tend to be relatively utilitarian devices, configured for the facilitated protection of the easily damaged media. Such cases are often relatively plain and unornamented (except for such graphics that may be inserted therein and visible therethrough). The structures of the cases (often referred to as "jewel boxes") themselves are typically rather simple hinged boxes, usually of transparent or translucent (and typically brittle) plastic material.

It is occasionally desirable to provide cases for such recorded or recordable media, that have enhanced visual interest.

Puzzle blocks, that involve the relative pivoting of groups of one or more blocks relative to other groups of one or more blocks, around not-so-apparent hinges integrated into the puzzle block structure, are known.

One such example of a puzzle block is sold under the mark "The Mental Block" by Genesis. The block comprises eight cubes that have various pictures, images or indicia on their apparent "outside" surfaces. The blocks are joined to one another through a series of hidden or concealed hinges, that permit the blocks to be pivoted, in groups of two or four, with respect to the other groups of blocks, so that faces of blocks that were previously hidden, are rotated to outwardly facing positions, while the previously exposed faces are pivoted to the "inside" of the group of eight blocks.

The hinges that interconnect the blocks, and the pattern of placement of the images on the blocks is such that whenever the group of blocks is in the form of a cube (4 blocks on a side, 2 high by 2 wide), the four images on each face of the collective cube together form a coherent composite image, whereas when the group of blocks is in the form of an elongated parallelepiped (4 blocks long by 2 blocks wide by 1 block deep), the individual images on the individual exposed faces on the various blocks do not necessarily collectively form a coherent image.

Such puzzle blocks owe their interest-grabbing capacity to the ability to provide an extended sequence of changing images in response to a series of manipulations by an operator.

It is desirable to make advantageous use of some of the characteristics of such puzzle boxes, in providing cases for the storage, vending, and/or transportation of recorded and/or recordable media, such as CD's, CD-ROMs and DVDs, to make the presentation for vending, and continued possession and operation of such articles more interesting.

These and other desirable characteristics of the invention will become apparent in light of the present specification and drawings.

SUMMARY OF THE INVENTION

The present invention is directed to a case for the containment of articles, comprising an upper portion, having at least a first member and a second member, the first and second members being configured for pivotable movement relative to one another, to provide a selectably openable and reclosable first passageway therebetween. A lower portion has at least a first member and a second member, the first and second members being configured for pivotable movement relative to one another, to provide a selectably openable and reclosable second passageway therebetween.

The second passageway is constrained in a closed configuration when the first passageway is in an open configuration, the first passageway being constrained to be in a closed configuration when the second passageway is in an open configuration.

A containment compartment is disposed between the upper portion and the lower portion, the containment compartment being selectively and mutually exclusively accessible through one of the first and second passageways.

In one preferred embodiment, the upper and lower portions each have a substantially planar cross-sectional configuration. In another preferred embodiment, the upper and lower portions each have a circular plan configuration.

Preferably, the upper portion comprises two upper half members, operably configured to pivot about two laterally spaced, parallel axes. Preferably, the lower portion comprises two lower half members, operable configured to pivot about two laterally spaced parallel axes. Preferably, the axes of the lower half members are disposed in a plane parallel to and vertically spaced from a plane containing the axes of the upper half members. Similarly, preferably the axes of the lower half members extend in a direction substantially perpendicular to the direction of the axes of the upper half members.

BRIEF DESCRIPTION OF THE DRAWINGS

FIG. 3 is a side elevation of the articulable media case, according to the embodiment of FIG. 1.

FIG. 4 is a side elevation of the articulable media case, according to the embodiment of FIG. 1, viewed 90° from the point of view of FIG. 3.

BEST MODE FOR CARRYING OUT THE INVENTION

Figure 1:
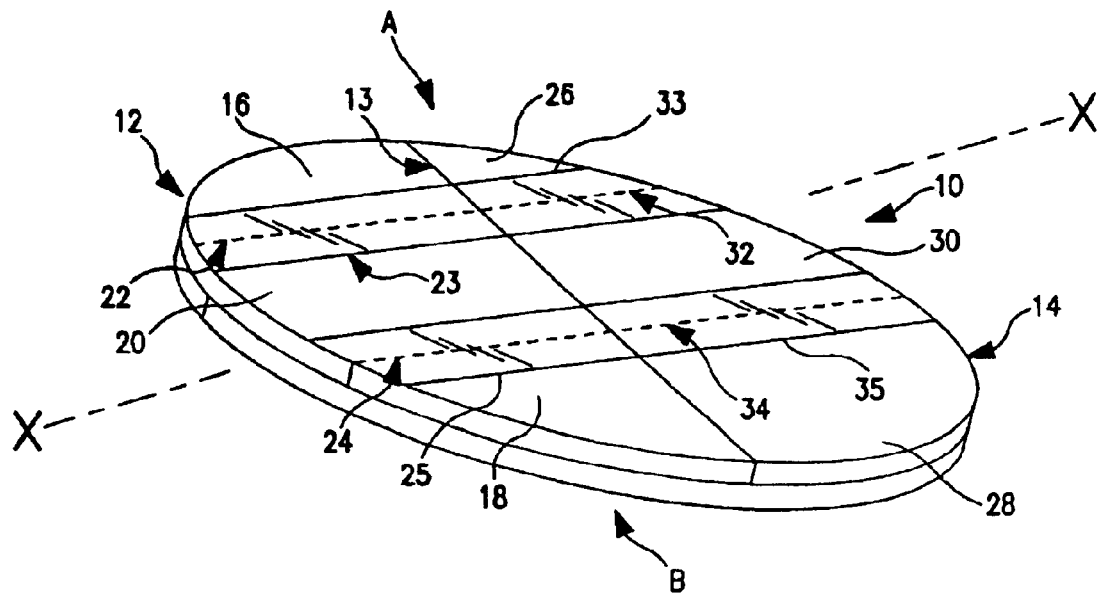
FIG. 1 is a top perspective view of the articulable media case, according to a preferred embodiment of the invention.

While this invention is susceptible of embodiment in many different forms, there are shown in the drawings and will be described in detail herein several specific embodiments, with the understanding that the present disclosure is to be considered an exemplification of the principles of the invention and is not intended to limit the invention to the embodiments illustrated.

Figure 2:
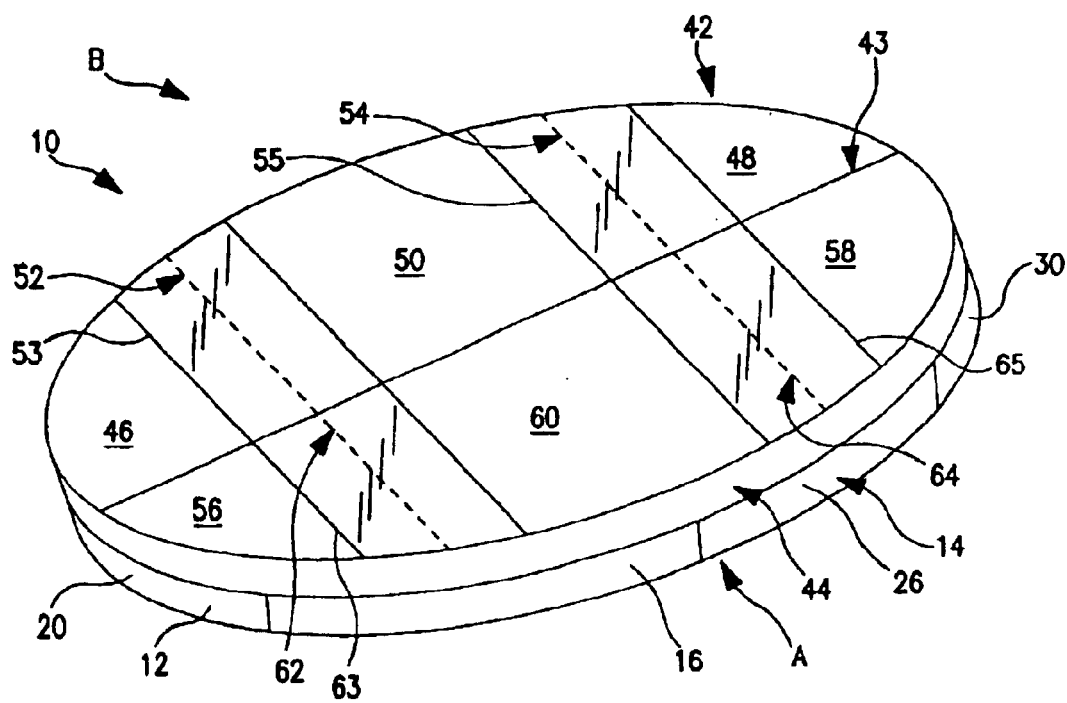
FIG. 2 is a bottom perspective view of the articulable media case, according to the embodiment of FIG. 1.

Articulable media case 10 is shown in top perspective view in FIG. 1, and in bottom perspective view, in FIG. 2. Case 10, in a preferred embodiment of the invention, has a circular plan when viewed orthogonally from the top or bottom, and is substantially flat-topped and flat-bottomed when viewed orthogonally from the side. However, other plan configurations may be employed, such as triangular, rectangular, or other polygonal shape, regular or otherwise, although regular geometric shapes are understood to lend themselves to the type of configuration and articulation to which the present invention is directed.

Case 10 includes an upper portion A formed by two upper halves 12 and 14, separated by break or cut line 13. Half 12 includes end sections 16, 18, and central section 20. Hinges 22, 24 are provided to make each of sections 16, 18, pivotable relative to central section 20. Half 14 includes end sections 26, 28 and central section 30. Hinges 32, 34 are provided to make each of sections 26, 28 pivotable relative to central section 30.

In a preferred embodiment of the invention, each of sections 14, 16, 20, 26, 28 and 30 are all fabricated from a light, easily formed material, such as plastic; foam core; corrugated paperboard; etc. Hinges 22, 24; 32, 34 may be formed by strips of tape (23, 25; 33, 35) that are used to connect the respective discrete and otherwise completely separate respective sections. Alternatively, the hinges may be formed by uncut continuations or webs that otherwise simply form the top layers or surfaces of the adjacent ones of the respective sections (not shown). The hinges 22, 24; 32, 34 (more specifically, tape strips 23, 25, 33, 35) provide the only connections between sections in the upper portion of case 10.

The "lower" portion B of case 10 is, in a preferred embodiment of the invention, essentially identical to the upper portion, except that it is rotated 90° from the orientation of the upper portion. Accordingly, upon rotation of the case 10 180° about line x—x of FIG. 1, case 10 is viewed as shown in FIG. 2, in which case 10 includes two halves 42, 44, separated by break or cut line 43.

Half 42 includes end sections 46, 48, and central section 50. Hinges 52, 54 are provided to make each of sections 46, 48, pivotable relative to central section 50. Half 44 includes end sections 56, 58 and central section 60. Hinges 62, 64 are provided to make each of sections 56, 58 pivotable relative to central section 60.

In a preferred embodiment of the invention, each of sections 44, 46, 50, 56, 58 and 60 are all fabricated from a light, easily formed material, such as plastic; foam core; corrugated paperboard; etc. Hinges 52, 54; 62, 64 may be formed by strips of tape (53, 55; 63, 65) that are used to connect the respective discrete and otherwise completely separate respective sections. Alternatively, the hinges may be formed by uncut continuations or webs that otherwise simply form the top layers or surfaces of the adjacent ones of the respective sections (not shown). The hinges 52, 54; 62, 64 (more specifically, tape strips 53, 55, 63, 65) provide the only connections between sections in the upper portion of case 10.

In order to hold upper portion A to lower portion B, fastening, in the form of adhesive, tape or the like is used to affix the two portions together. The location of the positions of fastening are those regions of case 10, that are radially (with respect to center C) "outside" of the regions where the respective hinge lines intersect, namely region I (where sections 16 and 56 overlap), region II (where sections 26 and 58 overlap), region III (where sections 28 and 48 overlap) and region IV (where sections 18 and 46 overlap). Placement of adhesive or fasteners in any other areas other than these specific overlapping regions may interfere with the articulation of the apparatus.

Figure 5:
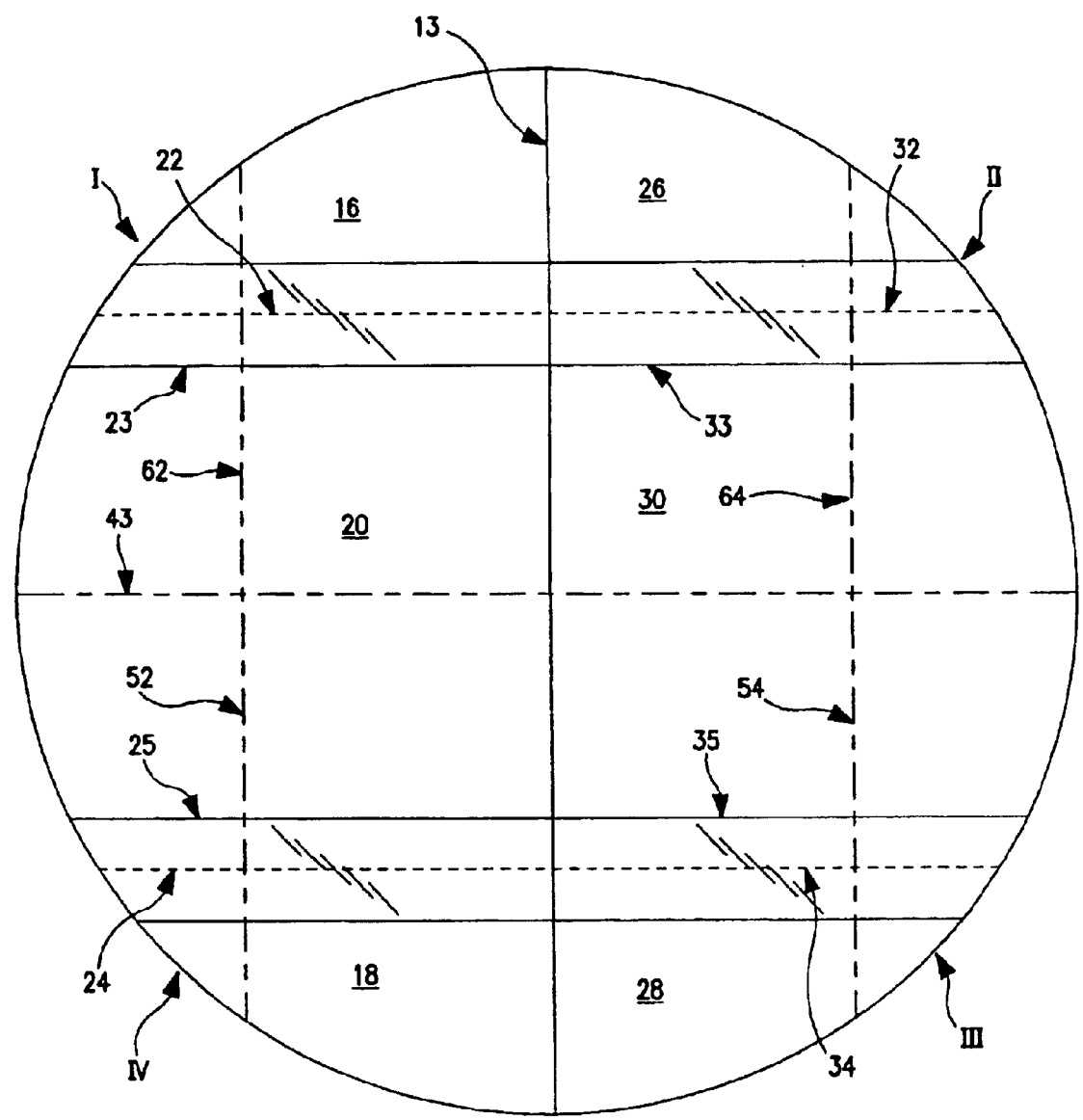
FIG. 5 is a top plan view of the articulable media case, according to the embodiment of FIG. 1, shown in a closed configuration.
Figure 6:
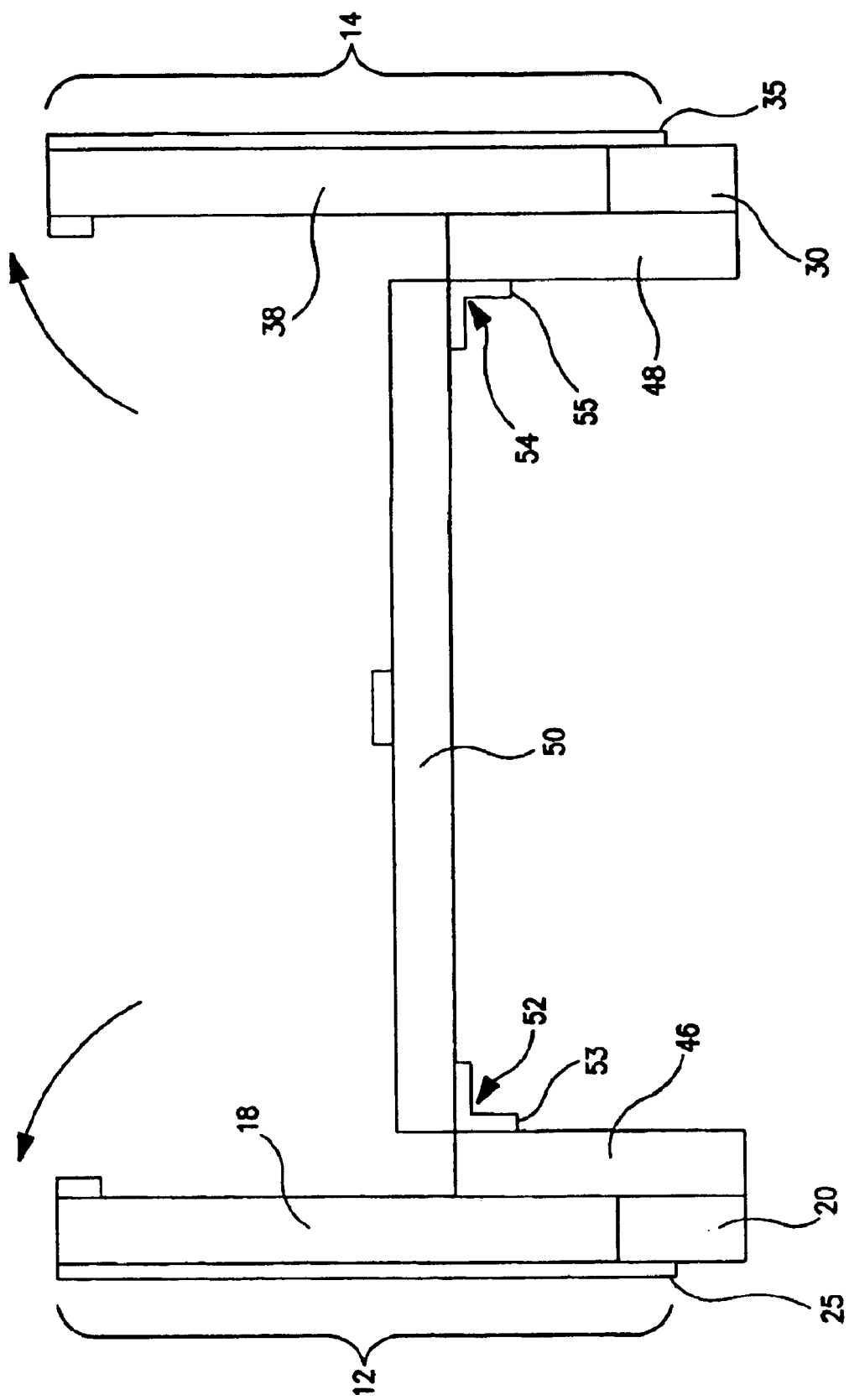
FIG. 6 is a side elevation of the articulable media case, according to the embodiment of FIG. 1, from the point of view of FIG. 3, shown in open configuration.

FIGS. 3 and 4 are side elevations of the case 10, which are shown 90° apart, around the circumference of the case (i.e., FIG. 4 is case 10 of FIG. 3, rotated 90° to the right—counterclockwise from a top plan or perspective view). FIG. 5 is a top plan view of case 10, in which certain items normally visible only from a bottom plan view are shown in broken lines.

The operation of case 10 for the placement, concealment, and exposure of a media disc will be discussed with respect to the articulation of case 10 to reveal the containment compartment as accessed from the top of case 10.

In order to access the containment compartment from the upper portion A of case 10, halves 12 and 14 are pivoted up and away from one another, exposing the "inside" surfaces of lower portion B sections 50 and 60, and the underside surfaces of upper portion A sections 16, 20, 18; 26, 30, 28.

Figure 7:
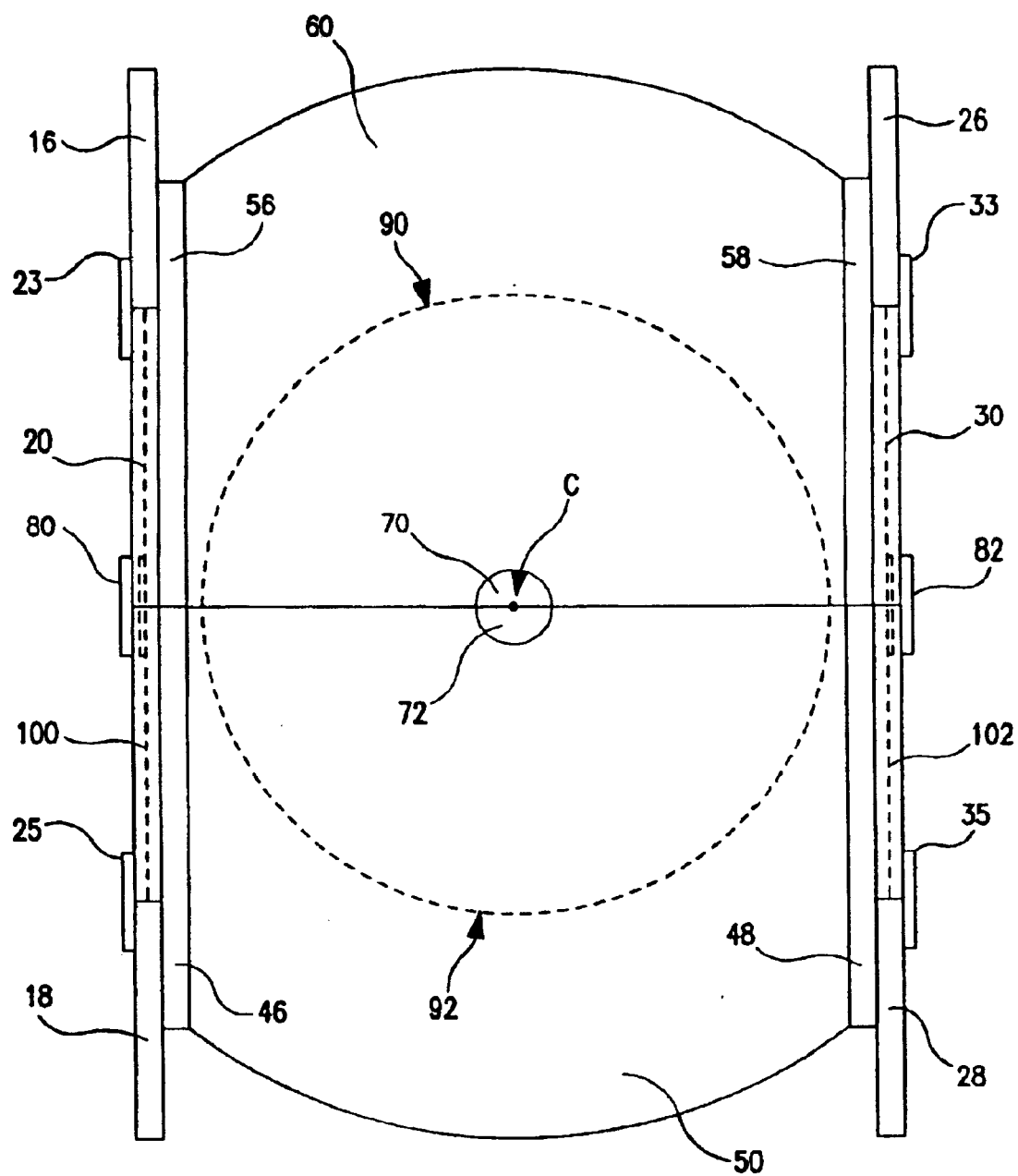
FIG. 7 is a top plan view of the articulable media case, shown in the open configuration of FIG. 6.

In one preferred embodiment of the invention, media disc locating members 70, 72 are located on the inside surfaces of sections 60, 50, respectively, while complementary disc locating members 80, 82 are affixed to the undersides of sections 20, 30, respectively (shown only in FIG. 7). The media disc locating members are preferably arranged in pairs and are sized to fit snugly, or even tightly, into the apertures in the media discs to be contained. Alternatively, the locating members may be formed of a single portion and sized to fit the aperture in the media discs. While, in the illustrated embodiment, the upper and lower portions are juxtaposed to one another, in the hinge regions, the juxta-positioning of the media disc locating members, when the case is closed, will cause the inside surfaces of sections 50, 60 to be slightly spaced apart from the inside surfaces of sections 20, 30 (not shown in FIGS. 1–4, for simplicity of illustration). Depending upon the rigidity of the materials used, some distortion of the case materials may be prompted, and depending upon the tightness of the fit between the media disc locating members and the disc aperture surfaces, the friction preferably will be sufficient to keep case 10 closed. Alternatively, the strips that form the hinges may be formed from relatively stiff materials (stiff metal or plastic) that have "memory" that will tend to keep case 10 in a closed configuration.

Alternatively, in order to accommodate the thickness of the disc or discs being held in each of the portions of the case, recesses (shown by broken lines 90, 92) formed in sections 60, 50 and/or recesses (shown by broken lines 100, 102) formed in sections 20, 30 may be provided into which the disc(s) may be received. Such recesses may be provided to alleviate or eliminate distortion or gaps that might otherwise be caused between the upper and lower portions of case 10, upon insertion of discs in either of the upper or lower compartments.

Access to the compartment from the lower portion B is accomplished by flipping case 10 over, so that it assumes the orientation shown in FIG. 2. sections 46, 50, 48; and 56, 60, 58 are pivoted up and away from one another, and away from sections 20, 30, about hinges 22–32, and 24–34, respectively, in a manner substantially identical as that described hereinabove.

In the embodiments of the invention that are illustrated and described herein, the articles that the case can accommodate are somewhat dictated by the shape and thicknesses of the sections forming the upper and lower portions of the case. It is understood that articles somewhat thicker than media discs can be accommodated, by increasing the thicknesses of the sections. However, it is further understood that such increase in the thicknesses of the sections (to permit, for example) recesses of greater depth, eventually will have an impact on the shapes of the sections, and the locations of the cuts and hinges.

The foregoing description and drawings merely explain and illustrate the invention and the invention is not limited thereto, as those skilled in the art who have the disclosure before them to make modifications and variations therein without departing from the scope of the invention.

What is claimed is:

1. A case for the containment of articles, the case comprising:

an upper portion, having at least a first member and a second member, the first and second members being configured for pivotable movement relative to one another, to provide a selectably openable and reclosable first passageway therebetween;

a lower portion, having at least a first member and a second member, the first and second members being configured for pivotable movement relative to one another, to provide a selectably openable and reclosable second passageway therebetween, the second passageway being constrained in a closed configuration when the first passageway is in an open configuration, the first passageway being constrained to be in a closed configuration when the second passageway is in an open configuration;

a containment compartment disposed between the upper portion and the lower portion, the containment compartment being selectively and mutually exclusively accessible through one of the first and second passageways.

2. The case according to claim 1, wherein the upper and lower portions each have a substantially planar cross-sectional configuration.

3. The case according to claim 1, the upper and lower portions each have a circular plan configuration.

4. The case according to claim 1, wherein the upper portion comprises:

two upper half members, operably configured to pivot about two laterally spaced, parallel axes.

5. The case according to claim 4, wherein the lower portion comprises:

two lower half members, operable configured to pivot about two laterally spaced parallel axes.

6. The case according to claim 5, wherein the axes of the lower half members are disposed in a plane parallel to and vertically spaced from a plane containing the axes of the upper half members.

7. The case according to claim 5, wherein the axes of the lower half members extend in a direction substantially perpendicular to the direction of the axes of the upper half members.

* * * * *